(12) United States Patent
Meador

(10) Patent No.: US 6,619,188 B1
(45) Date of Patent: Sep. 16, 2003

(54) BREWING APPARATUS AND METHOD

(76) Inventor: Keith Joseph Meador, 1900 Cresson Dr., Southlake, TX (US) 76092

( * ) Notice: Subject to any disclaimer, the term of this patent is extended or adjusted under 35 U.S.C. 154(b) by 0 days.

(21) Appl. No.: 10/084,127

(22) Filed: Feb. 28, 2002

(51) Int. Cl.[7] ............................................. A47J 31/24
(52) U.S. Cl. ........................ 99/295; 99/303; 99/302 R; 426/77; 426/112
(58) Field of Search ...................... 99/295, 303, 302 R; 426/77, 112, 115, 433, 435

(56) References Cited

U.S. PATENT DOCUMENTS

| | | | | | |
|---|---|---|---|---|---|
| 3,589,272 A | * | 6/1971 | Bouladon | ..................... | 99/295 |
| 4,167,899 A | * | 9/1979 | McCormick | .............. | 99/302 R |
| 5,104,666 A | * | 4/1992 | Sanvitale | ..................... | 426/77 |

* cited by examiner

*Primary Examiner*—Reginald L. Alexander

(57) ABSTRACT

A beverage brewing apparatus having a two chamber disposable cartridge that has fresh water in one chamber and brew ingredients in the other chamber. The cartridge fits into a cavity formed in a housing that includes a water heating system. The water heating system is energized when the disposable cartage is nested in the housing. The system produces a pre-measured volume of a brewed beverage or hot liquid automatically.

9 Claims, 4 Drawing Sheets

BREWING APPARATUS AND METHOD

TECHNICAL FIELD

This invention relates to brewing apparatus and more particularly to brewing apparatus having a prepackage unbrewed drink ingredients.

BACKGROUND OF THE INVENTION

Brewing apparatus typically include a prepackage set of ingredients (coffee, tea, etc.) that are placed in a brewing basket or bin which is a component of the brewing apparatus. The maker adds water to the brewing apparatus in a chamber that is designed to heat the water and cause the heated water to flow over the prepackaged ingredients. The process of preparing the brewed drink consists of 1. opening the brewing bin, 2. inserting a filter or a prepackaged mix, 2a. measuring the ingredients for the brew if not prepackaged, 3. adding a measured amount of water, 4. close the brewing bin, 5. place the carafe on the apparatus in a position to collect the brewed beverage, and turn on the brewing apparatus.

To accomplish this process many different designs of coffee makers have been proposed. All require the above process to make household type coffee. All of the prior art devices have an on board water tank, brew bin and require a filter. Filling the water tank has vulnerability for spillage. Filling the brew bin with coffee grounds allows the possibility to spill grounds outside the filter either on the counter, floor, or between the filter and the inner wall of the brew bin which introduces coffee grounds into the finished product.

Two ingredients water and coffee grounds influence the quality and consistency of a cup of coffee. Tap water is usually used for consumer coffee making. Tap water flavor varies depending on the treatment of the water and the region. Using the exact volume of water to a constant measurement of coffee is the only way to assure a consistent cup of coffee still vulnerable to the quality of the water and coffee.

Ground coffee is typically sold by the pound in resealable cans and bags. The can or bag of coffee is typically vacuum-sealed and after opening oxygen begins to affect the quality of the coffee grounds. The freshest cup of coffee produced is after the coffee container is first open and the quality deteriorates thereafter.

SUMMARY OF THE INVENTION

It is an object of the present invention to provide an improved beverage brewing apparatus and method.

In one aspect of the present invention, brew ingredients and water are pre-measured and sealed in a cartridge. In another aspect of the present invention, the water and brew ingredients are sealed in separate compartments of the cartridge. In yet another aspect of the present invention, a housing with a heating unit.

In still another aspect of the present invention, the brewing chamber has a shape complementary to at least a portion of the cartridge. In yet still another aspect of the present invention, the cartridge has a cap or cover portion adapted to seal against a rim portion of the housing. In a further aspect of the present invention, a valve assembly is installed in a lower portion of the housing to pierce the water compartment and control the flow of water over the heating unit.

In a yet further aspect of the present invention, a second piercing element is positioned to pierce the brew ingredients compartment to permit the passage of heated water to flow from the heating unit to the brew ingredients compartment. In a stir further aspect of the present invention, a third piercing element is positioned to pierce the brew ingredients chamber to direct the flow of a brewed beverage from the brew ingredients chamber to a drinking vessel. In a yet still further aspect of the present invention, the housing has a sensor positioned to initiate the brewing process when the cartridge is firmly and properly installed on the housing.

In a still further aspect of the present invention, a separate water cartridge and separate brew ingredients cartridge can be utilized to permit the user to combine any of the brew ingredients with any water cartridge or to heat water only.

In accordance with the object and aspects, the present invention:

Provides a prepackaged cartridge of water and brew ingredients,

Provides a housing in which to secure the prepackaged cartridge,

Provides a fresh brewed beverage.

DESCRIPTION OF AN EXEMPLARY EMBODIMENT

Figure 1:
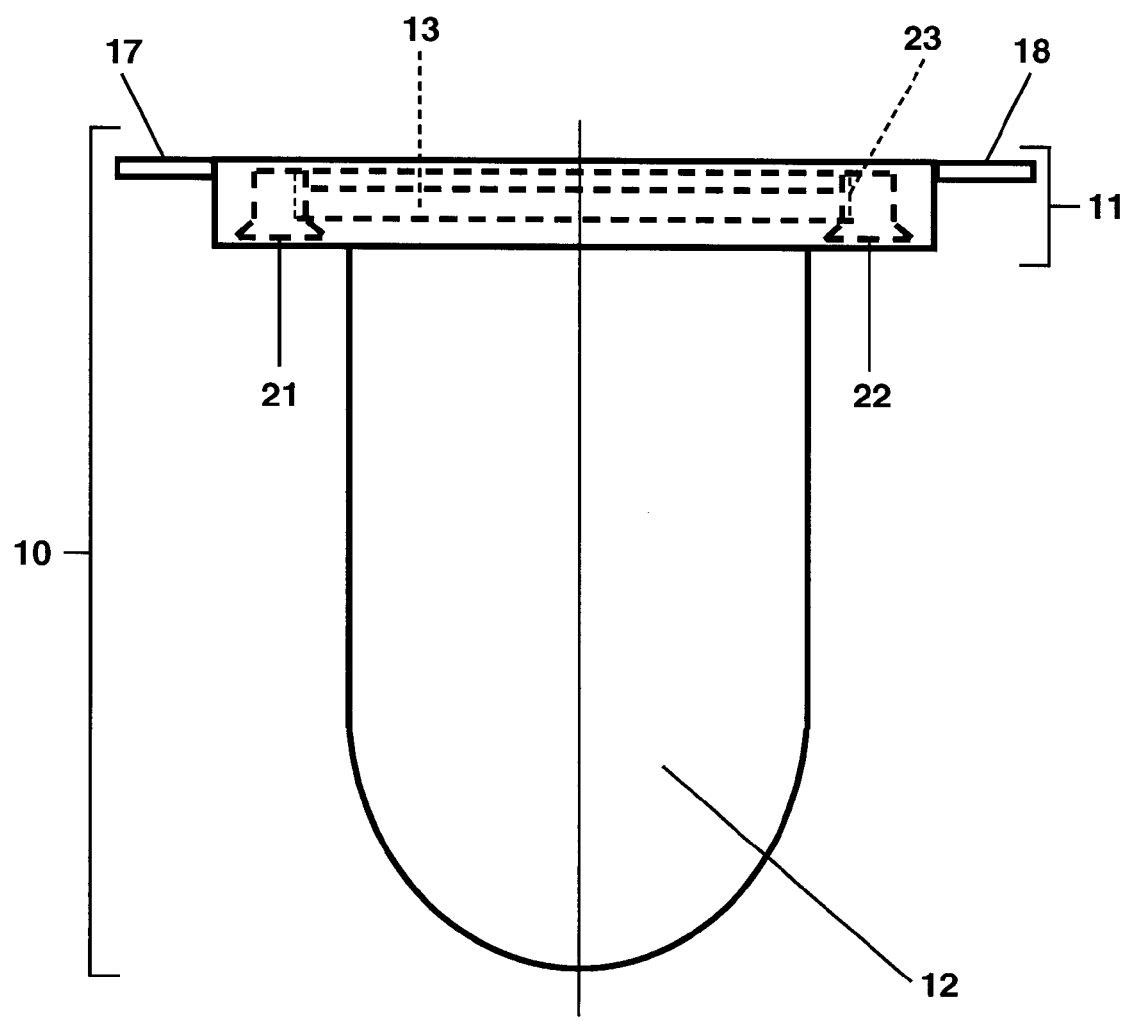
FIG. 1 is an elevational view of a cartridge portion of the present invention.
Figure 2:
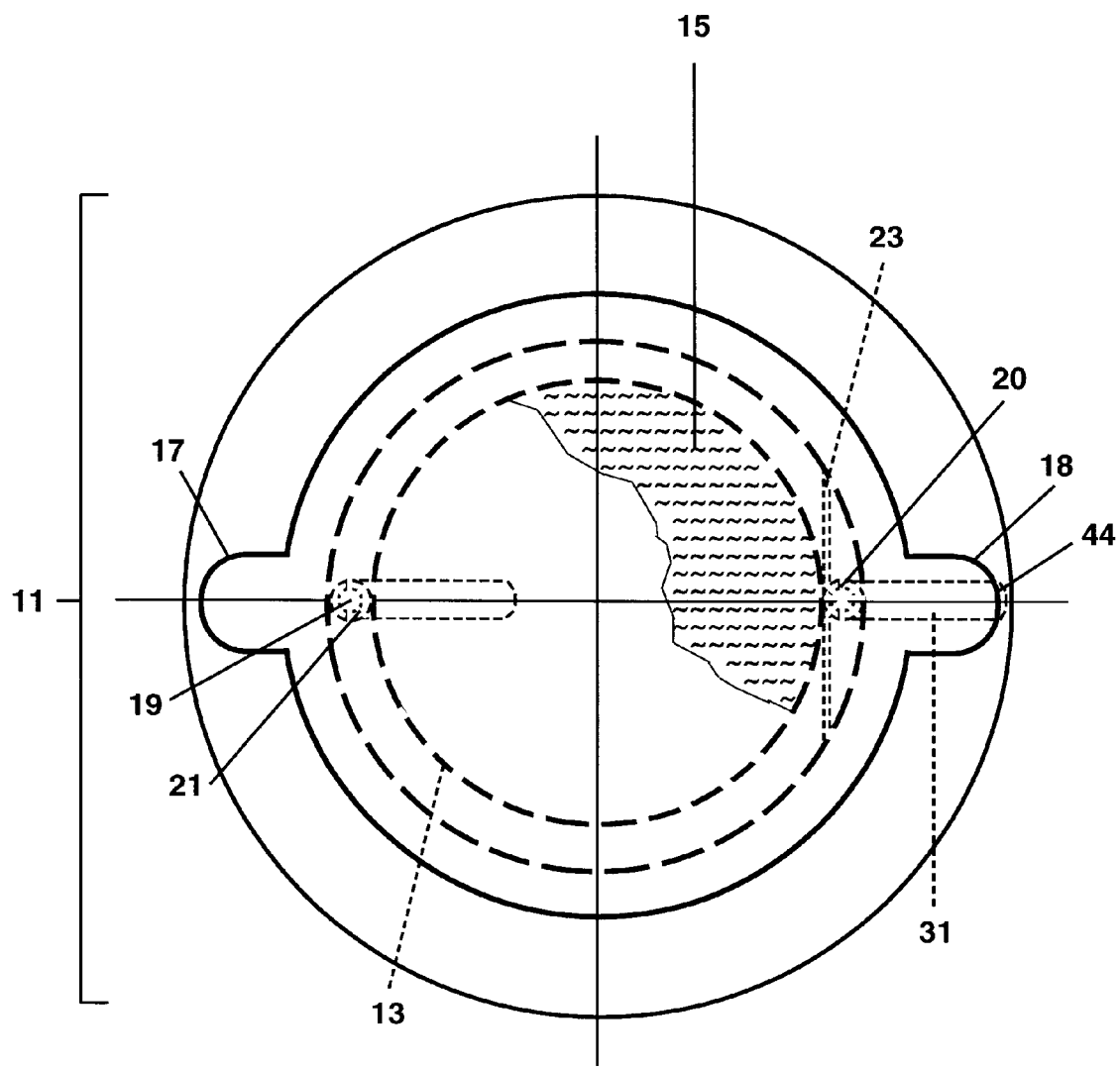
FIG. 2 is a view taken along line 2—2 of FIG. 1
Figure 4:
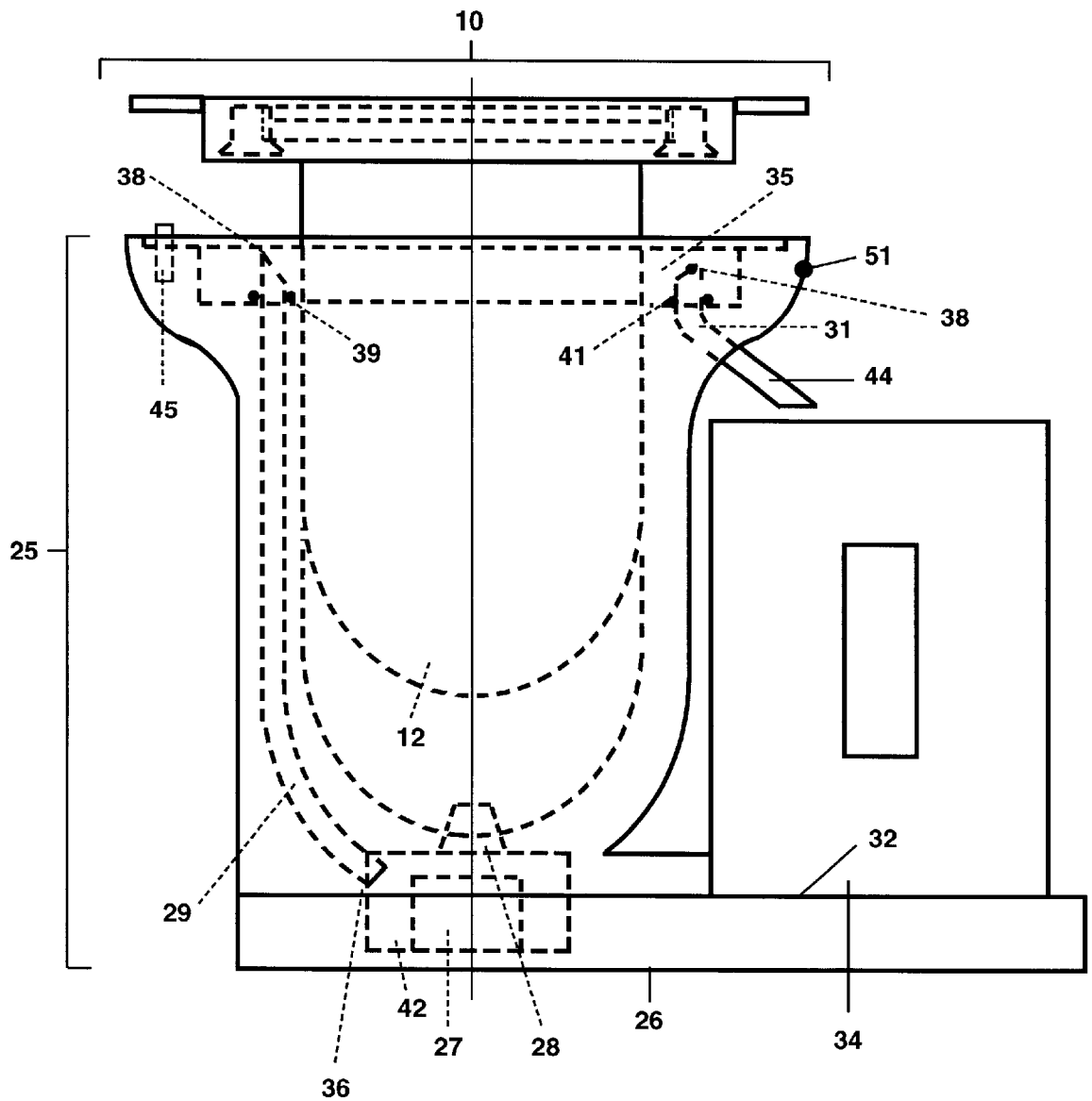
FIG. 4 is a view of the cartridge portion being placed in the housing portion.

Referring to the drawings wherein like characters represent the same or corresponding components throughout the several views there is seen in FIGS. 1, 2, and 4 a disposable cartridge 10 having a cover portion 11 and a water chamber 12. A brew chamber 13 is formed in the cover portion 11 above the water chamber 12. The water chamber 12 is sealed from direct contact with the brew chamber 13 The water chamber 12 preferably contains filtered and/or purified water if desired. The brew chamber 13 contains the ingredients for the beverage to be brewed, such as coffee grounds for example. The brew chamber 13 is foil sealed 15 as a top cover.

The cover portion 11 has a rim 16, FIG. 2, on which are formed two ears 17, 18. The cover also includes an inlet passage 19 and an outlet passage 20, both of which are covered or closed by foil seals 21 and 22. The foil seal 21 and 22 respectively prevents undetected tampering with the ingredients in the brew chamber 13. The inlet passage 19 directs liquid to the brew chamber 13 and the outlet passage 20 directs a brewed beverage from the brew chamber 13

A filter screen 23 prevents non-liquid contents of the brew from flowing into the egress passage 20. The ingress passage 19 permits substantial unrestricted flow of liquid into the brew chamber 13. If desired another filter screen 23 can cover a portion of the inlet passage 19 to prohibit non-liquid foreign matter from entering the brew chamber 13.

Figure 3:
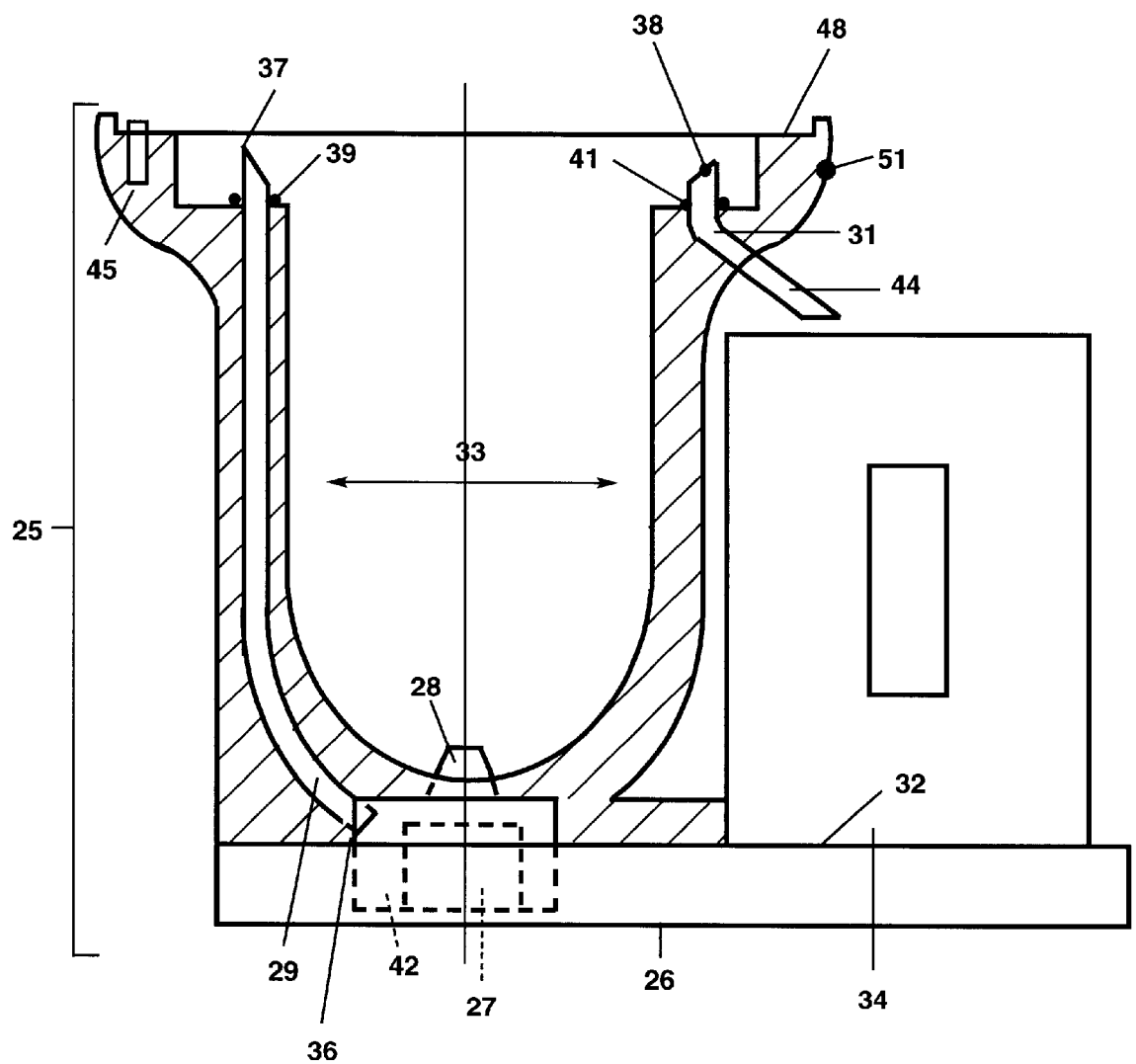
FIG. 3 is an elevational view of a housing portion of the present invention.

A housing 25, shown in FIGS. 3 and 4 includes a base 26, an electronic heating element 27, a piercing valve 28, a first passage or tube 29, a second passage or tube 31, and a vessel support 32 on which a vessel such as cup 34 is placed to receive the brewed beverage. The base 26 has a cavity 33 that is complementary in shape to the water chamber 12 and an upper receptacle 35 adapted to receive the cover portion 11. The passage 29 has a piercing end 37 extending into the upper receptacle 35. The passage 31 also has a piercing end 38 extending into the upper receptacle 35. A pair of annular seals 39, 41 surround the ends of respective passages 29,31 at their juncture with the upper receptacle 35.

The passage 29 has an end 36 disposed adjacent the heating element 27 in a collecting and heating chamber 42. The passage 31 has an outer end 44 that extends over the vessel support 32 and the cup 34. A micro-switch or sensor 45 is secured in the housing 25 adjacent the outer extreme of the upper receptacle 35 in one of two recesses 47, 48 which are adapted to receive the ears 17, 18. If two filter screens 23 are installed, the orientation of the cartridge 10 in the housing 25 is not critical. However, if the cartridge 10 is designed to be installed in a preferred position, the ears 17, 18 will have distinctive shapes to fit in respective recesses 47, 48. The cartridge 10, the cavity 33 and the upper receptacle 35 are substantially symmetrical about their respective longitudinal axes.

With reference to FIG. 3, the base housing 25 is connected with an appropriate electrical connection in a conventional manner. The cartridge 10 is inserted into the into the cavity 33. When the cartridge 10 is fully inserted, the piercing valve 28 will pierce the lower surface of the water container 12, the piercing 37, 38 will pierce the foil seals 21,22 and the ear 17 will engage the micro-switch 45. The heater 27 will be energized and water from the water container 12 will enter the heating chamber 42. The heated water will flow upward through the tube 29 and into the brew chamber 13 where the beverage will be brewed as the water passes to the tube 31 and into the cup 34. The brew ingredients in the brew chamber 13 are prevented from entering the tube 31 by the filter screen 23. When the heating chamber 42 is empty, the heating element 27 is de-energized by any conventional sensing circuit and the cup 34 can be remover from the support 32.

The conventional electronic circuitry, not shown, will illuminate a brewing indicator light 51 and simultaneously activate the electronic water-heating unit 27. Water will exit the water container 12 under the influence of the force of gravity and enter the water heater unit 27. The water will be heated and channeled up the tube 29. The hot water passes by the punctured foil 21 then through the screen 23 and into the brew chamber 13. The brew ingredients (i.e. coffee grounds) flavor the hot water. The brewed liquid passes through the other filter screen 23 to retain coffee grounds in coffee chamber 13, and exits through tube 31 into cup 34

The cartridge 10 is preferably formed of disposable material such as paper, cloth, plastics, or any material adapted for disposability and recycle ability. The embodiment described above is for the purpose of illustrating the invention, it should be understood that the form of the components can be different shapes and the overall size is relative to the amount of brewed beverage offered to be pre-packaged. If desired, the housing can be formed with multiple cavities and heating units to accommodate two or more cartridges at one time. While the water container 12 of the cartridge 10 is shown as a cylindrical body with a hemispherical end, other shapes can be employed. The primary concern is that the water container 12 and the cavity 33 have substantially complementary shapes or configurations. Thus both may be rectangular, trapezoidal or other geometric configuration. Also, while the preferred embodiment describes the cartridge 10 as having both a water container and a brew chamber, these elements can be formed separately and combined to provide the cartridge 10. This permits the user to combine any water container with any brew ingredients or to simply heat the water alone. By employing separate liquid and ingredients chambers, the user can have a flavored liquid that can be combined with any brew ingredients. For example, lemon flavored water can be combined with green tea to make lemon flavored tea, or apple cider can be combined with various spices to brew hot apple cider. The water container can also, for example, contain pure water, designer water, or distilled water.

What is claimed is:

1. A beverage brewer comprising:

a housing having a cavity formed therein and having a bottom, a piercing valve member disposed in said bottom of said cavity, a heating chamber in said housing adjacent said piercing valve member, a first tube having a first end communicating with said heating chamber and a second end, and a second tube having a first end and a second end; and a cartridge removably positioned in said cavity including a water chamber extending sufficiently into said cavity to engage said piercing valve member, and a cover including a rim portion engaging said housing to close the cavity, a brew chamber containing brew ingredients, a first opening sealingly engaging said second end of said first tube, a first passage means communicating between said first opening and said brew chamber to deliver heated liquid to said brew chamber, a second opening sealingly engaging said first end of said second tube, and a second passage means communicating between said brew chamber and said second tube to deliver a brewed substance from said brew chamber to said second tube.

2. The beverage brewer defined in claim 1 further comprising:

a filter element positioned between said brew chamber and said second tube to retard said brew ingredients from leaving said brew chamber.

3. The beverage brewer defined in claim 1 further comprising:

an electric heating unit situated in said heating chamber; and a sensor positioned in said housing to engage said cover to initiate energization of said heating unit.

4. The beverage brewer defined in claim 1 further comprising:

sealing membranes on said cover closing said first and second opening prior to insertion of said cartridge into said cavity; and said second end of said first tube having piercing means to pierce one of said membranes when said cover is installed on said housing; and said first end of said second tube having a piercing means to pierce another of said membranes when said cover is installed on said housing.

5. The beverage brewer defined in claim 1 further comprising:

a filter element positioned between said second end of said first tube to retard the ingress of non liquid elements from passing into said brew chamber from said first tube.

6. A beverage brewer comprising:

a housing having a cavity formed with an internal shape, a heating chamber formed in said housing below said cavity including a heating element, a piercing valve member disposed between said cavity and said heating chamber, first tube having a first end communicating with said heating chamber and a second end, and a second tube having a first end and a second end, sensor means for energizing said heating element when engaged;

a cartridge removably positionable in said cavity including a water chamber having an external shape complementary to said internal shape and being positionable said cavity to engage said piercing valve member, a cover including a rim portion engaging said housing to close the cavity, a brew chamber containing brew ingredients, a first opening being pierced by and sealingly engaging said second end of said first tube when said cartridge is positioned in a predetermined manner in said housing, a first passage means communicating between said first opening and said brew chamber to deliver heated liquid to said brew chamber, a second opening being pierced by and sealingly engaging said first end of said second tube when said cartridge is positioned in said predetermined manner, and a second passage means communicating between said brew chamber and said second tube to deliver a brewed substance from said brew chamber to said second tube, and means for engaging said sensor means in said housing to initiate said energizing of said heating element when said cartridge is positioned in said predetermined manner.

7. The beverage brewer defined in claim 6 further comprising:

a first filter element positioned between said brew chamber and said second tube to retard said brew ingredients from leaving said brew chamber, and a second filter element positioned between said second end of said first tube to retard the ingress of non liquid elements from passing into said brew chamber from said first tube.

8. A beverage brewer comprising:

a housing having a cavity formed therein and having a bottom, a piercing valve member disposed in said bottom of said cavity, a heating chamber in said housing adjacent said piercing valve member, a first tube having a first end communicating with said heating chamber and a second end, and a second tube having a first end and a second end; and a cartridge removably positioned in said cavity including a liquid chamber extending sufficiently into said cavity to engage said piercing valve member, and a cover including a rim portion engaging said housing to close the cavity, a brew chamber disposed above said liquid chamber, a first opening sealingly engaging said second end of said first tube, a first passage means communicating between said first opening and said brew chamber to deliver heated liquid to brew second chamber, a second opening sealingly engaging said first end of said second tube, and a second passage means communicating between said brew chamber and said second tube to deliver a heated liquid from said brew chamber to said second tube.

9. The beverage brewer defined in claim 8 further comprising:

a brew ingredients container disposed in said brew chamber.

\* \* \* \* \*